US012731592B2

(12) United States Patent
Laitinen et al.

(10) Patent No.: US 12,731,592 B2
(45) Date of Patent: Sep. 8, 2026

(54) COMBINING SPATIAL AUDIO STREAMS

(71) Applicant: NOKIA TECHNOLOGIES OY, Espoo (FI)

(72) Inventors: Mikko-Ville Laitinen, Espoo (FI); Adriana Vasilache, Tampere (FI); Tapani Pihlajakuja, Kellokoski (FI); Lasse Juhani Laaksonen, Tampere (FI); Anssi Sakari Rämö, Tampere (FI)

(73) Assignee: NOKIA TECHNOLOGIES OY, Espoo (FI)

(*) Notice: Subject to any disclaimer, the term of this patent is extended or adjusted under 35 U.S.C. 154(b) by 18 days.

(21) Appl. No.: 18/552,132

(22) PCT Filed: Mar. 22, 2021

(86) PCT No.: PCT/FI2021/050199

§ 371 (c)(1),
(2) Date: Sep. 22, 2023

(87) PCT Pub. No.: WO2022/200666

PCT Pub. Date: Sep. 29, 2022

(65) Prior Publication Data

US 2024/0185869 A1 Jun. 6, 2024

(51) Int. Cl.
*G10L 19/032* (2013.01)
*G10L 19/002* (2013.01)
*G10L 19/008* (2013.01)

(52) U.S. Cl.
CPC .......... *G10L 19/032* (2013.01); *G10L 19/002* (2013.01); *G10L 19/008* (2013.01)

(58) Field of Classification Search
CPC . G10L 19/008; G10L 19/032; G10L 19/0204; G10L 19/02; G10L 19/20; G10L 19/173; G10L 19/025; G10L 19/18; G10L 19/0208; G10L 13/07; G10L 19/22; G10L 19/00; G10L 25/03; G10L 19/035; G10L 19/24; G10L 25/06; G10L 21/028;
(Continued)

(56) References Cited

U.S. PATENT DOCUMENTS 12,046,250 B2 7/2024 Vasilache
2007/0016416 A1* 1/2007 Roden .................. G10L 19/008
704/E19.014

(Continued)

FOREIGN PATENT DOCUMENTS

BR PI0613099-2 A2 12/2010
CN 108496221 A 9/2018

(Continued)

OTHER PUBLICATIONS

Office Action for Japanese Application No. 2023-558512 dated Oct. 17, 2024, 12 pages.

(Continued)

*Primary Examiner* — Leshui Zhang
(74) *Attorney, Agent, or Firm* — ALSTON & BIRD LLP

(57) ABSTRACT

There is inter alia disclosed an apparatus for spatial audio encoding configured to determining an audio scene separation metric between an input audio signal and a further input audio signal. and using the audio scene separation metric for quantizing of at least one spatial audio parameter of the input audio signal.

12 Claims, 4 Drawing Sheets

(58) Field of Classification Search

CPC ....... G10L 25/78; G10L 25/93; G10L 19/002; G10L 19/012; H04S 2420/03; H04S 2400/11; H04S 2420/11; H04S 3/008; H04S 7/30; H04S 7/307; H04S 2400/15; H04S 3/02; H04S 7/40; H04S 2400/01; H04S 7/303; H04S 1/007; H04S 2420/01; H04S 3/004; H04S 5/02; H04S 7/305; H04S 2420/07; H04S 7/00; H04S 3/00; H04S 7/302; H04R 3/005; H04R 3/04; H04R 3/12; H04R 2205/024; H04R 2430/20; H04M 3/568

USPC ................................ 704/500–504; 381/1–23

See application file for complete search history.

(56) References Cited

U.S. PATENT DOCUMENTS

| | | | | |
|---|---|---|---|---|
| 2008/0201152 | A1 | 8/2008 | Pang et al. | |
| 2016/0042744 | A1* | 2/2016 | Klejsa | G10L 19/005 704/230 |
| 2019/0027157 | A1 | 1/2019 | Tsingos et al. | |
| 2020/0273473 | A1* | 8/2020 | Fuchs | G10L 19/008 |
| 2020/0357421 | A1 | 11/2020 | Fuchs et al. | |
| 2021/0176579 | A1* | 6/2021 | Laitinen | H04S 3/008 |
| 2021/0407525 | A1 | 12/2021 | Vasilache et al. | |
| 2022/0189494 | A1 | 6/2022 | Laitinen et al. | |
| 2022/0366918 | A1 | 11/2022 | Leppanen et al. | |

FOREIGN PATENT DOCUMENTS

| | | | | |
|---|---|---|---|---|
| CN | 112074902 | A | 12/2020 | |
| GB | 2575305 | A | 1/2020 | |
| GB | 2577698 | A | 4/2020 | |
| WO | WO 2005/093712 | A1 | 10/2005 | |
| WO | WO 2017/005978 | A1 | 1/2017 | |
| WO | WO 2019/086757 | A1 | 5/2019 | |
| WO | WO-2019170955 | A1 * | 9/2019 | G10L 21/028 |
| WO | WO 2019/193248 | A1 | 10/2019 | |
| WO | WO 2019/229300 | A1 | 12/2019 | |
| WO | WO 2020/008105 | A1 | 1/2020 | |
| WO | WO 2020/070377 | A1 | 4/2020 | |
| WO | WO 2020/089510 | A1 | 5/2020 | |
| WO | WO 2020/193865 | A1 | 10/2020 | |
| WO | WO 2021/032909 | A1 | 2/2021 | |
| WO | WO 2021/048468 | A1 | 3/2021 | |

OTHER PUBLICATIONS

Office Action for Canadian Application No. 3,212,985 dated Nov. 28, 2024, 4 pages.

Engdegard et al., "Spatial Audio Object Coding (SAOC)—The Upcoming MPEG Standard on Parametric Object Based Audio Coding", AES 124th Convention, (May 2008), 15 pages.

Extended European Search Report for European Application No. 21932810.1 dated Sep. 27, 2024, 9 pages.

International Search Report and Written Opinion for Patent Cooperation Treaty Application No. PCT/FI2021/050199 dated Dec. 22, 2021, 18 pages.

Nokia Corporation, "Proposal for MASA common metadata and metadata structure", 3GPP TSG-SA4#101 meeting, S4-181353, (Nov. 19-23, 2018), 4 pages.

Notification Requesting Information Relating to Family Patent for Vietnamese Application No. 1-2023-07299 dated Nov. 27, 2025, 3 pages.

First Examination Report for Indian Application No. 202317068327 dated Apr. 17, 2026, 7 pages.

Huang et al., "Bit-loading and power allocation algorithm for LPTV channel for BPLC systems", Tranducer and Microsystem Technologies, vol. 36, No. 3, (2017), 7 pages.

Office Action for Chinese Application No. 202180096130.8 dated May 28, 2026, 18 pages.

Office Action for Korean Application No. 10-2023-7035827 dated Jun. 16, 2026, 12 pages.

* cited by examiner

COMBINING SPATIAL AUDIO STREAMS

CROSS-REFERENCE TO RELATED APPLICATIONS

This application is a national phase entry of International Application No. PCT/FI2021/050199, filed Mar. 22, 2021, the contents of which are hereby incorporated by reference in their entirety.

FIELD

The present application relates to apparatus and methods for sound-field related parameter encoding, but not exclusively for time-frequency domain direction related parameter encoding for an audio encoder and decoder.

BACKGROUND

Parametric spatial audio processing is a field of audio signal processing where the spatial aspect of the sound is described using a set of parameters. For example, in parametric spatial audio capture from microphone arrays, it is a typical and an effective choice to estimate from the microphone array signals a set of parameters such as directions of the sound in frequency bands, and the ratios between the directional and non-directional parts of the captured sound in frequency bands. These parameters are known to well describe the perceptual spatial properties of the captured sound at the position of the microphone array. These parameters can be utilized in synthesis of the spatial sound accordingly, for headphones binaurally, for loudspeakers, or to other formats, such as Ambisonics.

The directions and direct-to-total energy ratios (or energy ratio parameters) in frequency bands are thus a parameterization that is particularly effective for spatial audio capture.

A parameter set consisting of a direction parameter in frequency bands and an energy ratio parameter in frequency bands (indicating the directionality of the sound) can be also utilized as the spatial metadata (which may also include other parameters such as surround coherence, spread coherence, number of directions, distance etc) for an audio codec. For example, these parameters can be estimated from microphone-array captured audio signals, and for example a stereo or mono signal can be generated from the microphone array signals to be conveyed with the spatial metadata. The stereo signal could be encoded, for example, with an AAC encoder and the mono signal could be encoded with an EVS encoder. A decoder can decode the audio signals into PCM signals and process the sound in frequency bands (using the spatial metadata) to obtain the spatial output, for example a binaural output.

The aforementioned solution is particularly suitable for encoding captured spatial sound from microphone arrays (e.g., in mobile phones, VR cameras, stand-alone microphone arrays). However, it may be desirable for such an encoder to have also other input types than microphone-array captured signals, for example, loudspeaker signals, audio object signals, or Ambisonic signals.

Analysing first-order Ambisonics (FOA) inputs for spatial metadata extraction has been thoroughly documented in scientific literature related to Directional Audio Coding (DirAC) and Harmonic planewave expansion (Harpex). This is since there exist microphone arrays directly providing a FOA signal (more accurately: its variant, the B-format signal), and analysing such an input has thus been a point of study in the field. Furthermore, the analysis of higher-order Ambisonics (HOA) input for multi-direction spatial metadata extraction has also been documented in the scientific literature related to higher-order directional audio coding (HO-DirAC).

A further input for the encoder is also multi-channel loudspeaker input, such as 5.1 or 7.1 channel surround inputs and audio objects.

The above processes may involve obtaining the directional parameters, such as azimuth and elevation, and energy ratio as spatial metadata through the multi-channel analysis in time-frequency domain. On the other hand, the directional metadata for individual audio objects may be processed in a separate processing chain. However, possible synergies in the processing of these two types of metadata is not efficiently utilised, if the metadata are processed separately.

SUMMARY

There is according to a first aspect a method for spatial audio encoding comprising: determining an audio scene separation metric between an input audio signal and a further input audio signal; and using the audio scene separation metric for quantizing of at least one spatial audio parameter of the input audio signal.

The method may further comprise using the audio scene separation metric for quantizing at least one spatial audio parameter of the further input audio signal.

Using the audio scene separation metric for quantizing the at least one spatial audio parameter for the input audio signal may comprise: multiplying the audio scene separation metric with an energy ratio parameter calculated for a time frequency tile of the input audio signal; quantizing the product of the audio scene separation metric with the energy ratio parameter to produce a quantization index; and using the quantization index to select a bit allocation for quantising the at least one spatial audio parameter of the input audio signal.

Alternatively, using the audio scene separation metric for quantizing the at least one spatial audio parameter of the input audio signal may comprise: selecting a quantizer from a plurality of quantizers for quantizing an energy ratio parameter calculated for a time frequency tile of the input audio signal, wherein the selection is dependent on the audio scene separation metric; quantizing the energy ratio parameter using the selected quantizer to produce a quantization index; and using the quantization index to select a bit allocation for quantising the energy ratio parameter together with the at least one spatial audio parameter of the input signal.

The at least one spatial audio parameter may be a direction parameter for the time frequency tile of the input audio signal, and the energy ratio parameter may be a direct-to-total energy ratio.

Uusing the audio scene separation metric for quantizing the at least one spatial audio parameter of the further input audio signal may comprise: selecting a quantizer from a plurality of quantizers for quantizing the at least one spatial audio parameter, wherein the selected quantizer is dependent on the audio scene separation metric; and quantizing the at least one spatial audio parameter with the selected quantizer The at least one spatial audio parameter of the further input audio signal may be an audio object energy ratio parameter for a time frequency tile of a first audio object signal of the further input audio signal.

The audio object energy ratio parameter for the time frequency tile of the first audio object signal of the further input audio signal may be determined by: determining an energy of the first audio object signal of a plurality of audio object signals for the time frequency tile of the further input audio signal; determining an energy of each remaining audio object signals of the plurality of audio object signals; and determining the ratio of the energy of the first audio object signal to the sum of the energies of the first audio object signal and remaining audio objects signals.

The audio scene separation metric may be determined between a time frequency tile of the input audio signal and a time frequency tile of the further input audio signal and wherein using the audio scene separation metric to determine the quantization of at least one spatial audio parameter of the further input audio signal may comprise: determining a further audio scene separation metric between a further time frequency tile of the input audio signal and a further time frequency tile of the further input audio signal; determining a factor to represent the audio scene separation metric and the further audio scene separation metric; selecting a quantizer from a plurality of quantizers dependent on the factor; and quantizing a further at least one spatial audio parameter of the further input audio signal using the selected quantizer.

The further at least one spatial audio parameter may be an audio object direction parameter for an audio frame of the further input audio signal.

The factor to represent the audio scene separation metric and the further audio scene separation metric maybe one of: the mean of the audio scene separation metric and the further audio scene separation metric; or the minimum of the audio scene separation metric and the further audio scene separation metric.

The stream separation index may provide a measure of relative contribution of each of the input audio signal and the further input audio signal to an audio scene comprising the input audio signal and the further input audio signal.

Determining the audio scene separation metric may comprise: transforming the input audio signal into a plurality of time frequency tiles; transforming the further input audio signal into a plurality of further time frequency tiles; determining an energy value of at least one time frequency tile; determining an energy value of at least one further time frequency tile; and determining the audio scene separation metric as a ratio of the energy value of the at least one time frequency tile to the sum of the at least one time frequency tile and the at least one further time frequency tile.

The input audio signal may comprise two or more audio channel signals and the further input audio signal may comprise a plurality of audio object signals.

There is according to a second aspect a method for spatial audio decoding comprising: decoding a quantized audio scene separation metric; and using the quantized audio scene separation metric to determine a quantized at least one spatial audio parameter associated with a first audio signal.

The method may further comprise using the quantized audio scene separation metric to determine a quantized at least one spatial audio parameter associated with a second audio signal.

Using the quantized audio scene separation metric to determine the quantized at least one spatial audio parameter associated with the first audio signal may comprise: selecting a quantizer from a plurality of quantizers used to quantize an energy ratio parameter calculated for a time frequency tile of the first audio signal, wherein the selection is dependent on the decoded quantized audio scene separation metric; determining the quantized energy ratio parameter from the selected quantizer; and using the quantization index of the quantized energy ratio parameter for the decoding of the at least one spatial audio parameter of the first audio signal.

The at least one spatial audio parameter may be a direction parameter for the time frequency tile of the first audio signal, and the energy ratio parameter may be a direct-to-total energy ratio.

Using the quantized audio scene separation metric to determine the quantized at least one spatial audio parameter representing the second audio signal may comprise: selecting a quantizer from a plurality of quantizers used to quantize the at least one spatial audio parameter for the second audio signal, wherein the selection is dependent on the decoded quantized audio scene separation metric; and determining the quantized at least one spatial audio parameter for the second audio signal from the selected quantizer used to quantize the at least one spatial audio parameter for the second audio signal.

The at least one spatial audio parameter of the second input audio signal may be an audio object energy ratio parameter for a time frequency tile of a first audio object signal of the second input audio signal.

The stream separation index may provide a measure of relative contribution of each of the first audio signal and the second audio signal to an audio scene comprising the first audio signal and the second audio signal.

The first audio signal may comprise two or more audio channel signals and wherein the second input audio signal may comprise a plurality of audio object signals.

There is provided according to a third aspect an apparatus for spatial audio encoding comprising; means for determining an audio scene separation metric between an input audio signal and a further input audio signal; and means for using the audio scene separation metric for quantizing of at least one spatial audio parameter of the input audio signal.

The apparatus further may comprises means for using the audio scene separation metric for quantizing at least one spatial audio parameter of the further input audio signal.

The means for using the audio scene separation metric for quantizing the at least one spatial audio parameter for the input audio signal may comprise: means for multiplying the audio scene separation metric with an energy ratio parameter calculated for a time frequency tile of the input audio signal;

means for quantizing the product of the audio scene separation metric with the energy ratio parameter to produce a quantization index; and means for using the quantization index to select a bit allocation for quantising the at least one spatial audio parameter of the input audio signal.

Alternatively, the means for using the audio scene separation metric for quantizing the at least one spatial audio parameter of the input audio signal may comprise: means for selecting a quantizer from a plurality of quantizers for quantizing an energy ratio parameter calculated for a time frequency tile of the input audio signal, wherein the selection is dependent on the audio scene separation metric; means for quantizing the energy ratio parameter using the selected quantizer to produce a quantization index; and means for using the quantization index to select a bit allocation for quantising the energy ratio parameter together with the at least one spatial audio parameter of the input signal.

The at least one spatial audio parameter may be a direction parameter for the time frequency tile of the input audio signal, and wherein the energy ratio parameter may be a direct-to-total energy ratio.

The means for using the audio scene separation metric for quantizing the at least one spatial audio parameter of the further input audio signal may comprise: means for selecting a quantizer from a plurality of quantizers for quantizing the at least one spatial audio parameter, wherein the selected quantizer is dependent on the audio scene separation metric; and means for quantizing the at least one spatial audio parameter with the selected quantizer The at least one spatial audio parameter of the further input audio signal may be an audio object energy ratio parameter for a time frequency tile of a first audio object signal of the further input audio signal.

The audio object energy ratio parameter for the time frequency tile of the first audio object signal of the further input audio signal may be determined by the means for determining an energy of the first audio object signal of a plurality of audio object signals for the time frequency tile of the further input audio signal; means for determining an energy of each remaining audio object signals of the plurality of audio object signals; and means for determining the ratio of the energy of the first audio object signal to the sum of the energies of the first audio object signal and remaining audio objects signals.

The audio scene separation metric may be determined between a time frequency tile of the input audio signal and a time frequency tile of the further input audio signal and wherein the means for using the audio scene separation metric to determine the quantization of at least one spatial audio parameter of the further input audio signal may comprise: means for determining a further audio scene separation metric between a further time frequency tile of the input audio signal and a further time frequency tile of the further input audio signal; means for determining a factor to represent the audio scene separation metric and the further audio scene separation metric; means for selecting a quantizer from a plurality of quantizers dependent on the factor; and means for quantizing a further at least one spatial audio parameter of the further input audio signal using the selected quantizer.

The further at least one spatial audio parameter may be an audio object direction parameter for an audio frame of the further input audio signal.

The factor to represent the audio scene separation metric and the further audio scene separation metric may be one of: the mean of the audio scene separation metric and the further audio scene separation metric; or the minimum of the audio scene separation metric and the further audio scene separation metric.

The stream separation index may provide a measure of relative contribution of each of the input audio signal and the further input audio signal to an audio scene comprising the input audio signal and the further input audio signal.

The means for determining the audio scene separation metric may comprise: means for transforming the input audio signal into a plurality of time frequency tiles; means for transforming the further input audio signal into a plurality of further time frequency tiles; means for determining an energy value of at least one time frequency tile; means for determining an energy value of at least one further time frequency tile;

and means for determining the audio scene separation metric as a ratio of the energy value of the at least one time frequency tile to the sum of the at least one time frequency tile and the at least one further time frequency tile.

The input audio signal may comprise two or more audio channel signals and the further input audio signal may comprise a plurality of audio object signals.

There is provided according to a fourth aspect an apparatus for spatial audio decoding comprising: means for decoding a quantized audio scene separation metric; and means for using the quantized audio scene separation metric to determine a quantized at least one spatial audio parameter associated with a first audio signal.

The apparatus may further comprise means for using the quantized audio scene separation metric to determine a quantized at least one spatial audio parameter associated with a second audio signal.

The means for using the quantized audio scene separation metric to determine the quantized at least one spatial audio parameter associated with the first audio signal may comprise: means for selecting a quantizer from a plurality of quantizers used to quantize an energy ratio parameter calculated for a time frequency tile of the first audio signal, wherein the selection is dependent on the decoded quantized audio scene separation metric; means for determining the quantized energy ratio parameter from the selected quantizer; and means for using the quantization index of the quantized energy ratio parameter for the decoding of the at least one spatial audio parameter of the first audio signal.

The at least one spatial audio parameter may be a direction parameter for the time frequency tile of the first audio signal, and the energy ratio parameter may be a direct-to-total energy ratio.

The means for using the quantized audio scene separation metric to determine the quantized at least one spatial audio parameter representing the second audio signal may comprise: means for selecting a quantizer from a plurality of quantizers used to quantize the at least one spatial audio parameter for the second audio signal, wherein the selection is dependent on the decoded quantized audio scene separation metric; and means for determining the quantized at least one spatial audio parameter for the second audio signal from the selected quantizer used to quantize the at least one spatial audio parameter for the second audio signal.

The at least one spatial audio parameter of the second input audio signal may be an audio object energy ratio parameter for a time frequency tile of a first audio object signal of the second input audio signal.

The stream separation index may provide a measure of relative contribution of each of the first audio signal and the second audio signal to an audio scene comprising the first audio signal and the second audio signal.

The first audio signal may comprise two or more audio channel signals and wherein the second input audio signal comprises a plurality of audio object signals.

According to a fifth aspect there is an apparatus for spatial audio encoding comprising at least one processor and at least one memory including computer program code, the at least one memory and the computer program code configured to determine an audio scene separation metric between an input audio signal and a further input audio signal; and use the audio scene separation metric for quantizing of at least one spatial audio parameter of the input audio signal.

According to a sixth aspect there is an apparatus for spatial audio decoding comprising at least one processor and at least one memory including computer program code, the at least one memory and the computer program code configured to decode a quantized audio scene separation metric; and use the quantized audio scene separation metric to determine a quantized at least one spatial audio parameter associated with a first audio signal.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
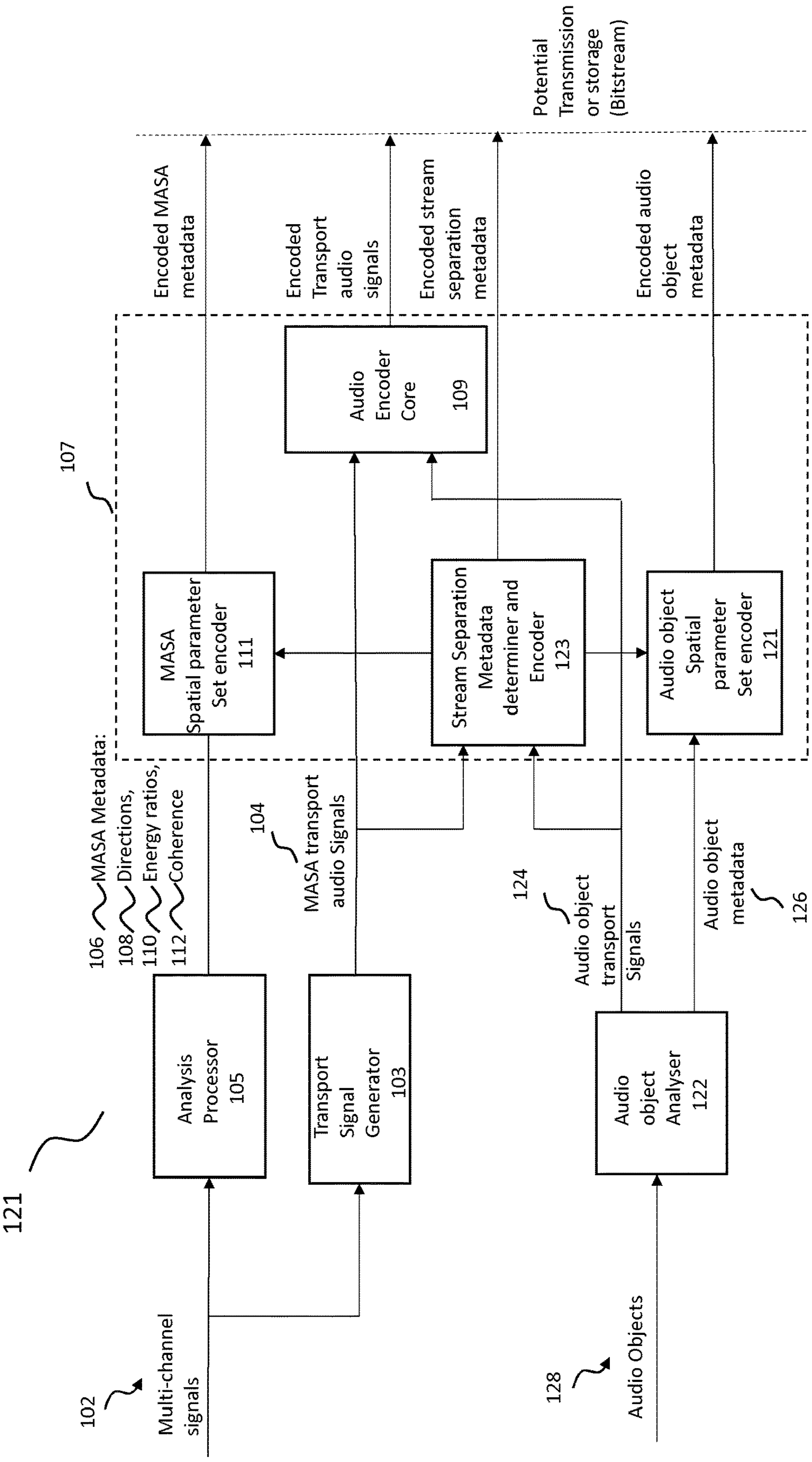
FIG. 1 shows schematically a system of apparatus suitable for implementing some embodiments.

The following describes in further detail suitable apparatus and possible mechanisms for the provision of effective spatial analysis derived metadata parameters. In the following discussions multi-channel system is discussed with respect to a multi-channel microphone implementation. However as discussed above the input format may be any suitable input format, such as multi-channel loudspeaker, ambisonic (FOA/HOA) etc. It is understood that in some embodiments the channel location is based on a location of the microphone or is a virtual location or direction. Furthermore, the output of the example system is a multi-channel loudspeaker arrangement. However, it is understood that the output may be rendered to the user via means other than loudspeakers. Furthermore, the multi-channel loudspeaker signals may be generalised to be two or more playback audio signals. Such a system is currently being standardised by the 3GPP standardization body as the Immersive Voice and Audio Service (IVAS). IVAS is intended to be an extension to the existing 3GPP Enhanced Voice Service (EVS) codec in order to facilitate immersive voice and audio services over existing and future mobile (cellular) and fixed line networks. An application of IVAS may be the provision of immersive voice and audio services over 3GPP fourth generation (4G) and fifth generation (5G) networks. In addition, the IVAS codec as an extension to EVS may be used in store and forward applications in which the audio and speech content is encoded and stored in a file for playback. It is to be appreciated that IVAS may be used in conjunction with other audio and speech coding technologies which have the functionality of coding the samples of audio and speech signals.

Metadata-assisted spatial audio (MASA) is one input format proposed for IVAS. MASA input format may comprise a number of audio signals (1 or 2 for example) together with corresponding spatial metadata. The MASA input stream may be captured using spatial audio capture with a microphone array which may be mounted in a mobile device for example. The spatial audio parameters may then be estimated from the captured microphone signals.

The MASA spatial metadata may consist at least of spherical directions (elevation, azimuth), at least one energy ratio of a resulting direction, a spread coherence, and surround coherence independent of the direction, for each considered time-frequency (TF) block or tile, in other words a time/frequency sub band. In total IVAS may have a number of different types of metadata parameters for each time-frequency (TF) tile. The types of spatial audio parameters which make up the spatial metadata for MASA are shown in Table 1 below.

| Field | Bits | Description |
|---|---|---|
| Direction index | 16 | Direction of arrival of the sound at a time-frequency parameter interval. Spherical representation at about 1-degree accuracy. Range of values: "covers all directions at about 1° accuracy" |
| Direct-to-total energy ratio | 8 | Energy ratio for the direction index (i.e., time-frequency subframe). Calculated as energy in direction/total energy. Range of values: [0.0, 1.0] |
| Spread coherence | 8 | Spread of energy for the direction index (i.e., time-frequency subframe). Defines the direction to be reproduced as a point source or coherently around the direction. Range of values: [0.0, 1.0] |
| Diffuse-to-total energy ratio | 8 | Energy ratio of non-directional sound over surrounding directions. Calculated as energy of non-directional sound/total energy. Range of values: [0.0, 1.0] (Parameter is independent of number of directions provided.) |
| Surround coherence | 8 | Coherence of the non-directional sound over the surrounding directions. Range of values: [0.0, 1.0] (Parameter is independent of number of directions provided.) |
| Remainder-to-total energy ratio | 8 | Energy ratio of the remainder (such as microphone noise) sound energy to fulfil requirement that sum of energy ratios is 1. Calculated as energy of remainder sound/total energy. Range of values: [0.0, 1.0] (Parameter is independent of number of directions provided.) |
| Distance | 8 | Distance of the sound originating from the direction index (i.e., time-frequency subframes) in meters on a logarithmic scale. Range of values: for example, 0 to 100 m. (Feature intended mainly for future extensions, e.g., 6DoF audio.) |

This data may be encoded and transmitted (or stored) by the encoder in order to be able to reconstruct the spatial signal at the decoder.

Moreover, in some instances metadata assisted spatial audio (MASA) may support up to two directions for each TF tile which would require the above parameters to be encoded and transmitted for each direction on a per TF tile basis. Thereby almost doubling the required bit rate according to Table 1. In addition, it is easy to foresee that other MASA systems may support more than two directions per TF tile.

The bitrate allocated for metadata in a practical immersive audio communications codec may vary greatly. Typical overall operating bitrates of the codec may leave only 2 to 10 kbps for the transmission/storage of spatial metadata. However, some further implementations may allow up to 30 kbps or higher for the transmission/storage of spatial metadata. The encoding of the direction parameters and energy ratio components has been examined before along with the encoding of the coherence data. However, whatever the transmission/storage bit rate assigned for spatial metadata there will always be a need to use as few bits as possible to represent these parameters especially when a TF tile may support multiple directions corresponding to different sound sources in the spatial audio scene.

In addition to multi-channel input signals, which are then subsequently encoded as MASA audio signals, an encoding system may also be required to encode audio objects representing various sound sources. Each audio object can be accompanied, whether it is in the form of metadata or some other mechanism, by directional data in the form of azimuth and elevation values which indicate the position of an audio object within a physical space. Typically, an audio object may have one directional parameter value per audio frame.

The concept as discussed hereafter is to improve the encoding of multiple inputs into a spatial audio coding system such as the IVAS system, whilst such a system is presented with multi-channel audio signal stream as discussed above and a separate input stream of audio objects. Efficiencies in encoding may be achieved by exploiting synergies between the separate input streams.

In this regard FIG. 1 depicts an example apparatus and system for implementing embodiments of the application. The system is shown with an 'analysis' part 121.

The 'analysis' part 121 is the part from receiving the multi-channel signals up to an encoding of the metadata and downmix signal.

The input to the system 'analysis' part 121 is the multi-channel signals 102. In the following examples a microphone channel signal input is described, however any suitable input (or synthetic multi-channel) format may be implemented in other embodiments. For example, in some embodiments the spatial analyser and the spatial analysis may be implemented external to the encoder. For example, in some embodiments the spatial (MASA) metadata associated with the audio signals may be provided to an encoder as a separate bit-stream. In some embodiments the spatial (MASA) metadata may be provided as a set of spatial (direction) index values.

Additionally, FIG. 1 also depicts multiple audio objects 128 as a further input to the analysis part 121. As mentioned above these multiple audio objects (or audio object stream) 128 may represent various sound sources within a physical space. Each audio object may be characterized by an audio (object) signal and accompanying metadata comprising directional data (in the form of azimuth and elevation values) which indicate the position of the audio object within a physical space on an audio frame basis.

The multi-channel signals 102 are passed to a transport signal generator 103 and to an analysis processor 105.

In some embodiments the transport signal generator 103 is configured to receive the multi-channel signals and generate a suitable transport signal comprising a determined number of channels and output the transport signals 104 (MASA transport audio signals). For example, the transport signal generator 103 may be configured to generate a 2-audio channel downmix of the multi-channel signals. The determined number of channels may be any suitable number of channels. The transport signal generator in some embodiments is configured to otherwise select or combine, for example, by beamforming techniques the input audio signals to the determined number of channels and output these as transport signals.

In some embodiments the transport signal generator 103 is optional and the multi-channel signals are passed unprocessed to an encoder 107 in the same manner as the transport signal are in this example.

In some embodiments the analysis processor 105 is also configured to receive the multi-channel signals and analyse the signals to produce metadata 106 associated with the multi-channel signals and thus associated with the transport signals 104. The analysis processor 105 may be configured to generate the metadata which may comprise, for each time-frequency analysis interval, a direction parameter 108 and an energy ratio parameter 110 and a coherence parameter 112 (and in some embodiments a diffuseness parameter). The direction, energy ratio and coherence parameters may in some embodiments be considered to be MASA spatial audio parameters (or MASA metadata). In other words, the spatial audio parameters comprise parameters which aim to characterize the sound-field created/captured by the multi-channel signals (or two or more audio signals in general).

In some embodiments the parameters generated may differ from frequency band to frequency band. Thus, for example in band X all of the parameters are generated and transmitted, whereas in band Y only one of the parameters is generated and transmitted, and furthermore in band Z no parameters are generated or transmitted. A practical example of this may be that for some frequency bands such as the highest band some of the parameters are not required for perceptual reasons. The MASA transport signals 104 and the MASA metadata 106 may be passed to an encoder 107.

The audio objects 128 may be passed to the audio object analyser 122 for processing. In other embodiments, the audio object analyser 122 may be sited within the functionality of the encoder 107.

In some embodiments the audio object analyser 122 analyses the object audio input stream 128 in order to produce suitable audio object transport signals 124 and audio object metadata 126. For example, the audio object analyser 122 may be configured to produce the audio object transport signals 124 by downmixing the audio signals of the audio objects into a stereo channel together with amplitude panning based on the associated audio object directions. Additionally, the audio object analyser 122 may also be configured to produce the audio object metadata 126 associated with the audio object input stream 128. The audio object metadata 126 may comprise for each time-frequency analysis interval at least a direction parameter and an energy ratio parameter.

The encoder 107 may comprise an audio encoder core 109 which is configured to receive the MASA transport audio (for example downmix) signals 104 and Audio object transport signals 124 in order to generate a suitable encoding of these audio signals. The encoder 107 may furthermore comprise a MASA spatial parameter set encoder 111 which is configured to receive the MASA metadata 106 and output an encoded or compressed form of the information as Encoded MASA metadata. The encoder 107 may also comprise an audio object metadata encoder 121 which is similarly configured to receive the audio object metadata 126 and output an encoded or compressed form of the input information as Encoded audio object metadata.

Additionally, the encoder 107 may also comprise a stream separation metadata determiner and encoder 123 which can be configured to determine the relative contributory proportions of the multi-channel signals 102 (MASA audio signals) and audio objects 128 to the overall audio scene. This measure of proportionality produced by the stream separation metadata determiner and encoder 123 may be used to determine the proportion of quantizing and encoding "effort" expended for the input multi-channel signals 102 and the audio objects 128. In other words, the stream separation metadata determiner and encoder 123 may produce a metric which quantifies proportion of the encoding effort expended on the MASA audio signals 102 compared to the encoding effort expended on the audio objects 128. This metric may be used to drive the encoding of the Audio object metadata 126 and the MASA metadata 106. Furthermore, the metric as determined by the separation metadata determiner and encoder 123 may also be used as an influencing factor in the process of encoding the MASA transport audio signals 104 and audio object transport audio signal 124 performed by the audio encoder core 109. The output metric from the stream separation metadata determiner and encoder 123 is represented as encoded stream separation metadata and may be combined into the encoded metadata stream from the encoder 107.

The encoder 107 can in some embodiments be a computer or mobile device (running suitable software stored on memory and on at least one processor), or alternatively a specific device utilizing, for example, FPGAs or ASICs. The encoding may be implemented using any suitable scheme. In some embodiments the encoder 107 may further interleave, multiplex to a single data stream or embed the encoded MASA metadata, audio object metadata and stream separation metadata within the encoded (downmixed) transport audio signals before transmission or storage shown in FIG. 1 by the dashed line. The multiplexing may be implemented using any suitable scheme.

Therefore, in summary first the system (analysis part) is configured to receive multi-channel audio signals.

Then the system (analysis part) is configured to generate a suitable transport audio signal (for example by selecting or downmixing some of the audio signal channels) and the spatial audio parameters as metadata.

The system is then configured to encode for storage/transmission the transport signal and the metadata.

After this the system may store/transmit the encoded transport and metadata.

Figure 2:
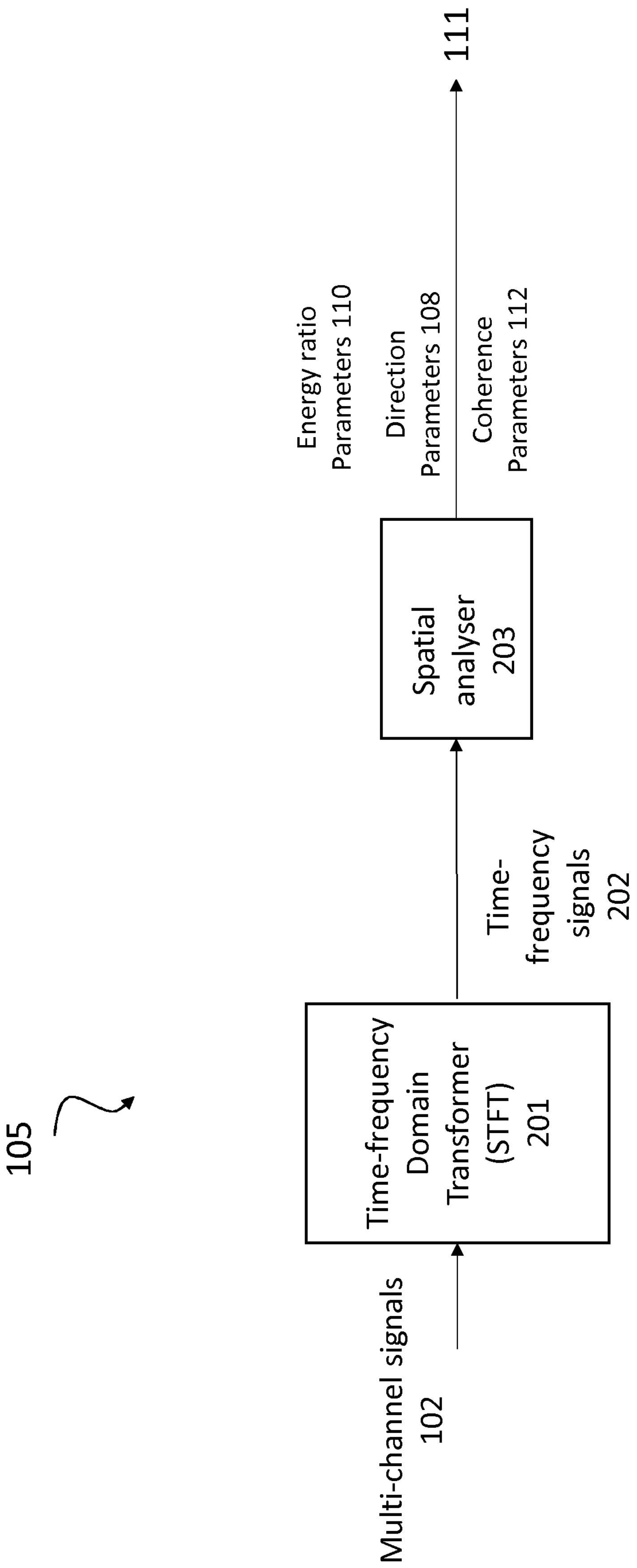
FIG. 2 shows schematically the metadata encoder according to some embodiments.

With respect to FIG. 2 an example analysis processor 105 and Metadata encoder/quantizer 111 (as shown in FIG. 1) according to some embodiments is described in further detail.

FIGS. 1 and 2 depict the Metadata encoder/quantizer 111 and the analysis processor 105 as being coupled together. However, it is to be appreciated that some embodiments may not so tightly couple these two respective processing entities such that the analysis processor 105 can exist on a different device from the Metadata encoder/quantizer 111. Consequently, a device comprising the Metadata encoder/quantizer 111 may be presented with the transport signals and metadata streams for processing and encoding independently from the process of capturing and analysing.

The analysis processor 105 in some embodiments comprises a time-frequency domain transformer 201.

In some embodiments the time-frequency domain transformer 201 is configured to receive the multi-channel signals 102 and apply a suitable time to frequency domain transform such as a Short Time Fourier Transform (STFT) in order to convert the input time domain signals into a suitable time-frequency signals. These time-frequency signals may be passed to a spatial analyser 203.

Thus for example, the time-frequency signals 202 may be represented in the time-frequency domain representation by $$s_{MASA}(b, n, i),$$

where b is the frequency bin index and n is the time-frequency block (frame) index and i is the channel index. In another expression, n can be considered as a time index with a lower sampling rate than that of the original time-domain signals. These frequency bins can be grouped into sub bands that group one or more of the bins into a sub band of a band index k=0, . . . , K−1. Each sub band k has a lowest bin $b_{k,low}$ and a highest bin $b_{k,high}$, and the subband contains all bins from $b_{k,low}$ to $b_{k,high}$. The widths of the sub bands can approximate any suitable distribution. For example, the Equivalent rectangular bandwidth (ERB) scale or the Bark scale.

A time frequency (TF) tile (n,k) (or block) is thus a specific sub band k within a subframe of the frame n.

It is to be noted, that the subscript "MASA" when attached to a parameter signifies that the parameter has been derived from the multi-channel input signals 102, and the subscript "Obj" signifies that the parameter has been derived from the Audio object input stream 128.

It can be appreciated that the number of bits required to represent the spatial audio parameters may be dependent at least in part on the TF (time-frequency) tile resolution (i.e., the number of TF subframes or tiles). For example for the "MASA" input multi-channel audio signals, a 20 ms audio frame may be divided into 4 time-domain subframes of 5 ms a piece, and each time-domain subframe may have up to 24 frequency subbands divided in the frequency domain according to a Bark scale, an approximation of it, or any other suitable division. In this particular example the audio frame may be divided into 96 TF subframes/tiles, in other words 4 time-domain subframes with 24 frequency subbands. Therefore, the number of bits required to represent the spatial audio parameters for an audio frame can be dependent on the TF tile resolution. For example, if each TF tile were to be encoded according to the distribution of Table 1 above then each TF tile would require 64 bits per sound source direction. For two sound source directions per TF tile there would be a need of 2×64 bits for the complete encoding of both directions. It is to be noted that the use of the term sound source can signify dominant directions of the propagating sound in the TF tile.

In embodiments the analysis processor 105 may comprise a spatial analyser 203. The spatial analyser 203 may be configured to receive the time-frequency signals 202 and based on these signals estimate direction parameters 108. The direction parameters may be determined based on any audio based 'direction' determination.

For example, in some embodiments the spatial analyser 203 is configured to estimate the direction of a sound source with two or more signal inputs.

The spatial analyser 203 may thus be configured to provide at least one azimuth and elevation for each frequency band and temporal time-frequency block within a frame of an audio signal, denoted as azimuth $\phi_{MASA}(k, n)$, and elevation $\theta_{MASA}(k, n)$. The direction parameters 108 for the time sub frame may be passed to the MASA spatial parameter set (metadata) set encoder 111 for encoding and quantizing.

The spatial analyser 203 may also be configured to determine an energy ratio parameter 110. The energy ratio may be considered to be a determination of the energy of the audio signal which can be considered to arrive from a direction. The direct-to-total energy ratio $r_{MASA}(k, n)$(in other words an energy ratio parameter) can be estimated, e.g., using a stability measure of the directional estimate, or using any correlation measure, or any other suitable method to obtain a ratio parameter. Each direct-to-total energy ratio corresponds to a specific spatial direction and describes how much of the energy comes from the specific spatial direction compared to the total energy. This value may also be represented for each time-frequency tile separately. The spatial direction parameters and direct-to-total energy ratio describe how much of the total energy for each time-frequency tile is coming from the specific direction. In general, a spatial direction parameter can also be thought of as the direction of arrival (DOA).

In general, the direct-to-total energy ratio parameter for multi-channel captured microphone array signals can be estimated based on the normalized cross-correlation parameter cor'(k, n) between a microphone pair at band k, the value of the cross-correlation parameter lies between −1 and 1. A direct-to-total energy ratio parameter r(k, n) can be determined by comparing the normalized cross-correlation parameter to a diffuse field normalized cross correlation parameter $cor'_D(k,n)$ as $$r(k,n)=\frac{cor'(k,n)-cor'_D(k,n)}{1-cor'_D(k,n)}.$$

The direct-to-total energy ratio is explained further in PCT publication WO2017/005978 which is incorporated herein by reference.

For the case of the multi-channel input audio signals the direct-to-total energy ratio parameter $r_{MASA}(k, n)$ratio may be passed to the MASA spatial parameter set (metadata) set encoder 111 for encoding and quantizing The spatial analyser 203 may furthermore be configured to determine a number of coherence parameters 112 (for the multi-channel signals 102) which may include surrounding coherence ($\gamma_{MASA}(k, n)$)) and spread coherence ($\zeta_{MASA}(k, n)$), both analysed in time-frequency domain.

The spatial analyser 203 may be configured to output the determined coherence parameters spread coherence parameter ζMASA and surrounding coherence parameter $\gamma_{MASA}$ to the MASA spatial parameter set (metadata) set encoder 111 for encoding and quantizing.

Therefore, for each TF tile there will be a collection of MASA spatial audio parameters associated with each sound source direction. In this instance each TF tile may have the following audio spatial parameters associated with it on a per sound source direction basis; an azimuth and elevation denoted as azimuth $\phi_{MASA}(k, n)$, and elevation $\theta_{MASA}(k, n)$, a spread coherence ($\gamma_{MASA}(k,n)$) and a direct-to-total energy ratio parameter $r_{MASA}(k, n)$. In addition, each TF tile may also have a surround coherence ($\zeta_{MASA}(k, n)$) which is not allocated on a per sound source direction basis.

In a manner similar to that of the processing performed by the analysis processor 105, the audio object analyser 122 may analyse the input audio object stream to produce an audio object time frequency domain signal which may be denoted as $$S_{obj}(b,n,i),$$

Where, as before b is the frequency bin index and n is the time-frequency block (TF tile) (frame) index and i is the channel index. The resolution of the audio object time frequency domain signal may be the same as the corresponding MASA time frequency domain signal such that both sets of signals may be aligned in terms of time and frequency resolution. For instance, the audio object time frequency domain signal $S_{obj}(b, n, i)$, may have the same time resolution on a TF tile n basis, and the frequency bins b may be grouped into the same pattern of sub bands k as deployed for the MASA time frequency domain signal. In other words, each sub band k of the audio object time frequency domain signal may also have a lowest bin $b_{k,low}$ and a highest bin $b_{k,high}$, and the subband k contains all bins from $b_{k,low}$ to $b_{k,high}$. In some embodiments the processing of the audio object stream may not necessary follow the same level of granularity as the processing for the MASA audio signals. For instance, the MASA processing may have a different time frequency resolution to that of the time frequency resolution for the audio object stream. In these instances, in order to bring alignment between the audio object stream processing and MASA audio signal processing various techniques may be deployed such as parameter interpolation or one set of parameters may be deployed as a super set of the other set of parameters.

Accordingly, the resulting resolution of the time frequency (TF) tile for the audio object time frequency domain signal may be the same as the resolution of the time frequency (TF) tile for the MASA time frequency domain signal.

It is to be noted that the audio object time frequency domain signal may be termed the Object transport audio signals and the MASA time frequency domain signal may be termed the MASA transport audio signals in FIG. 1.

The Audio object analyser 122 may determine a direction parameter for each Audio object on an audio frame basis. The audio object direction parameter may comprise an azimuth and an elevation for each audio frame. The direction parameter may be denoted as azimuth $\phi_{obj}$ and elevation $\theta_{obj}$.

The Audio object analyser 122 may also be configured to find an audio object-to-total energy ratio $r_{obj}(k, n, i)$ (in other words an audio object ratio parameter) for each the audio object signal i. In embodiments the audio object-to-total energy ratio $r_{obj}(k, n, i)$ may be estimated as the proportion of the energy of the object i to the energy of all audio objects $$r_{obj}(k,n,i)=\frac{\sum_{b_{k,low}}^{b_{k,high}}|S_{obj}(b,n,i)|^2}{\sum_{i=0}^{I}\sum_{b_{k,low}}^{b_{k,high}}|S_{obj}(b,n,i)|^2}$$

Where $$\sum_{b_{k,low}}^{b_{k,high}}|S_{obj}(b,n,i)|^2$$

is the energy for the audio object i, for a frequency band k, and time subframe n, where $b_{k,low}$ is the lowest and $b_{k,high}$ the highest bin for the frequency band k.

In essence, the audio object analyser 122 may comprise the similar functional processing blocks as the analysis processor 105 in order to produce the spatial audio parameters (metadata) associated with the audio object signals, namely the audio object-to-total energy ratio $r_{obj}(k, n, i)$ for each TF tile of the audio frame, and direction components azimuth $\phi_{obj,i}$, and elevation $\theta_{obj,i}$ for the audio frame, for an audio object i. In other words, the audio object analyser 122 may comprise similar processing blocks to the time domain transformer and spatial analyser present in the analysis processor 105. The spatial audio parameters (or metadata) associated with the audio object signals may then be passed to the audio object spatial parameter set (metadata) set encoder 121 for encoding and quantizing.

It is to be appreciated that processing steps for the audio object-to-total energy ratio $r_{obj}(k, n, i)$ maybe performed on a per TF tile basis. In other words, the processing required for the direct-to-total energy ratios is performed for each sub band k and sub frame n of an audio frame, whereas the direction components azimuth $\phi_{obj,i}$ and elevation $\theta_{obj,i}$ are obtained on an audio frame basis for the audio object i As mentioned above the stream separation metadata determiner and encoder 123 maybe arranged to accept the MASA transport audio signals 104 and the Object transport audio signals 124. The stream separation metadata determiner and encoder 123 may then use these signals to determine the stream separation metric/metadata.

In embodiments the stream separation metric may be found by first determining the energies in each of the MASA transport audio signals 104 and the Object transport audio signals 124. This maybe expressed as for each TF tile as $$E_{obj}(k,n)=\sum_{i=0}^{1}\sum_{b_{k,low}}^{b_{k,high}}|S_{obj}(b,n,i)|^2,$$

$$E_{MASA}(k,n)=\sum_{i=0}^{I}\sum_{b_{k,low}}^{b_{k,high}}|S_{MASA}(b,n,i)|^2,$$

where I is the number of transport audio signals, and $b_{k,low}$ is the lowest and $b_{k,high}$ the highest bin for a frequency band k.

In embodiments the stream separation metadata determiner and encoder 123 may then be arranged to determine the stream separation metric by calculating the proportion of MASA energies to total audio energies on a TF tile basis (total audio energies being the combined MASA and audio object energies). This may be expressed as the ratio of MASA energies in each of the MASA transport audio signals to the total energies in each of the MASA and Object transport audio signals Accordingly, the stream separation metric (or audio stream separation metric) may be expressed on a TF tile basis (k,n) as $$\mu(k,n)=\frac{E_{MASA}(k,n)}{E_{MASA}(k,n)+E_{obj}(k,n)}$$

The stream separation metric μ(k, n) may then be quantised by the stream separation metadata determiner and encoder 123 in order to facilitate onward transmission or storage of the parameter. The stream separation metric μ(k, n) may also be referred to as the MASA-to-total energy ratio.

An example, procedure for quantising the stream separation metric μ(k, n) (for each TF tile) may comprise the following:

- Arrange all MASA-to-total energy ratios in an audio frame as a (M×N) matrix where M is the number of subframes in an audio frame and N is the number of subbands in the audio frame.
- Transform the matrix using a two-dimensional DCT (Discrete Cosine Transform).
- The zero order DCT coefficient may then by quantized with an optimized codebook
- The remaining DCT coefficients can be scalarly quantized with the same resolution
- The indices of the scalar quantized DCT coefficients may then be encoded with a Golomb Rice code
- The quantised MASA-to-total energy ratios in an audio frame may then be formed into a bitstream suitable format by having the index of the zero-order coefficient (at a fixed rate) followed by as many of the GR encoded indices as allowed in accordance with the number of bits allocated for quantising the MASA-to-total energy ratios.
- The indexes may then be arranged in the bitstream in a zig-zag order following the second diagonal direction and starting from the upper left corner. The number of indexes added to the bitstream is limited by the amount of available bits for the encoding of the MASA-to-total ratios.

The output from the stream separation metadata determiner and encoder 123 is the quantised stream separation metric $\mu_q(k, n)$ which may also be referred to as the quantised MASA-to-total energy ratio. The quantised MASA-to-total energy ratio may be passed to the MASA spatial parameter set encoder 111 in order to drive or influence the encoding and quantizing of the MASA spatial audio parameters (in other words the MASA metadata).

For spatial audio coding systems which solely encodes MASA audio signals the quantization of the MASA spatial audio direction parameters for each TF tile can be dependent on the (quantised) direct-to-total energy ratio $r_{MASA}(k, n)$ for the tile. In such systems, the direct-to-total energy ratio $r_{MASA}(k, n)$ for the TF tile may then be first quantised with a scalar quantizer. The index assigned to quantize the direct-to-total energy ratio $r_{MASA}(k, n)$ for the TF tile may then be used to determine the number of bits allocated for the quantization of all the MASA spatial audio parameters (including the direct-to-total energy ratios $r_{MASA}(k, n)$) for the TF tile in question.

However, the spatial audio coding system of the present invention is configured to encode both multi-channel audio signals (MASA audio signals) and audio objects. In such systems the overall audio scene may be composed as a contribution from the multi-channel audio signals and a contribution from the audio objects. Consequently, the quantization of the MASA spatial audio direction parameters for a particular TF tile in question may not be solely dependent on the MASA direct-to-total energy ratio $r_{MASA}$ (k, n), rather instead may be dependent on a combination of the MASA direct-to-total energy ratio $r_{MASA}$ (k, n) and the and the stream separation metric μ(k, n) for the particular TF tile.

In embodiments, this combination of dependencies may be expressed by first multiplying the quantised MASA direct-to-total energy ratio $r_{MASA}(k, n)$ by the quantised stream separation metric $\mu_q$ (k, n) (or MASA-to-total energy ratio) for the TF tile to give a weighted MASA direct-to-total energy ratio $wr_{MASA}$ (k, n).

$$wr_{MASA}(k,n)=\mu_q(k,n)*r_{MASA}(k,n).$$

The weighted MASA direct-to-total energy ratio $wr_{MASA}$ (k, n) (for the TF tile) may then be quantized with a scalar quantizer, for example a 3-bit quantizer in order to determine the number of bits allocated for quantising the set of MASA spatial audio parameters being transmitted to the decoder on a TF tile basis. To be clear this set of MASA spatial audio parameters includes at least the direction parameters $\phi_{MASA}$ (k, n), and elevation $\theta_{MASA}(k, n)$) and the direct-to-total energy ratio $r_{MASA}(k, n)$.

For example, an index from the 3 bit quantizer used for quantising the weighted MASA direct-to-total energy $wr_{MASA}(k, n)$ may yield a bit allocation from the following array [11, 11, 10, 9, 7, 6, 5, 3].

The encoding of the direction parameters @MASA (k, n), $\theta_{MASA}(k, n)$) and additionally the spread coherence and surround coherence (in the other words the remaining spatial audio parameters for the TF tile) may then proceed using a bit allocation from an array such as the one above by using some example processes as detailed in patent application publications WO2020/089510, WO2020/070377, WO2020/008105, WO2020/193865 and WO2021/048468.

In other embodiments the resolution of the quantisation stage may be made variable in relation to the MASA direct-to-total energy ratio $r_{MASA}(k, n)$. For example, if the MASA-to-total energy ratio $\mu_q(k, n)$ is low (e.g. smaller than 0.25) then the MASA direct-to-total energy ratio $r_{MASA}(k, n)$ may be quantized with a low resolution quantizer, for example a 1 bit quantizer. However, if the MASA -to-total energy ratio $\mu_q(k, n)$ is higher (e.g. between 0.25 and 0.5) then a higher resolution quantizer maybe used, for instance a 2-bit quantizer. However, if the MASA-to-total energy ratio $\mu_q(k, n)$ is greater than 0.5 (or some other threshold value which is higher than the threshold value for the next lower resolution quantizer) then an even higher resolution quantizer maybe used, for instance a 3-bit quantizer.

The output from the MASA spatial parameter set encoder 121 may then be the quantization indices representing the quantized MASA direct-to-total energy ratios, quantized MASA direction parameters, quantized spread and surround coherence parameters. This is depicted as encoded MASA metadata in FIG. 1.

The quantised MASA-to-total energy ratio $\mu_q(k, n)$ may also be passed to the audio object spatial parameter set encoder 121 for a similar purpose, i.e. to drive or influence the encoding and quantizing of the audio object spatial audio parameters (in other words the audio object metadata).

As above the MASA-to-total energy ratio $\mu_q(k, n)$ may be used to influence the quantisation of the audio object-to-total energy ratio $r_{obj}(k, n, i)$ for an audio object i. For example, if the MASA -to-total energy ratio is low then the audio object -to-total energy ratio $r_{obj}(k, n, i)$ may be quantized with a low resolution quantizer, for example a 1 bit quantizer. However, if the MASA-to-total energy ratio is higher then a higher resolution quantizer maybe used, for instance a 2-bit quantizer. However, if the MASA-to-total energy ratio is greater than 0.5 (or some other threshold value which is higher than the threshold value for the next lower resolution quantizer) then an even higher resolution quantizer maybe used, for instance a 3-bit quantizer.

Additionally, the MASA-to-total energy ratio $\mu_q(k, n)$ may be used to influence the quantisation of the audio object direction parameter for the audio frame. Typically, this may be achieved by first finding an overall factor to represent the MASA-to-total energy ratio for the whole audio frame up. In some embodiments $\mu_F$ may be the minimum value of MASA-to-total energy ratio $\mu_q(k, n)$ over all TF tiles in the frame. Other embodiments may calculate $\mu_F$ to be the average value of MASA-to-total energy ratio $\mu_q(k, n)$ over all TF tiles in the frame. The MASA-to-total energy ratio for the whole audio frame up may then be used to guide the quantisation of the audio object direction parameter for the frame. For instance, if the MASA-to-total energy ratio for the whole audio frame up is high then the audio object direction parameter may be quantized with a low resolution quantizer and when the MASA-to-total energy ratio for the whole audio frame up is low then the audio object direction parameter may be quantized with a high resolution quantizer.

The output from the Audio object parameter set encoder 121 may then be the quantization indices representing the quantized audio object-to-total energy ratios $r_{obj}(k, n, i)$ for the TF tiles of the audio frame, and the quantization index representing the quantized audio object direction parameter for each audio object i. This is depicted as encoded audio object metadata in FIG. 1.

With respect to the audio encoder core 109, this processing block may be arranged audio encoder to receive the MASA transport audio (for example downmix) signals 104 and Audio object transport signals 124 and combine them into a single combined audio transport signal. The combined audio transport signal may then be encoded using a suitable audio encoder, examples of which may include the 3GPP Enhanced Voice Service codec or the MPEG Advanced Audio Codec.

The bitstream for storage or transmission may then be formed by multiplexing the encoded MASA metadata, the encoded stream separation metadata, the encoded audio object metadata and the encoded combined transport audio signals.

The system may retrieve/receive the encoded transport and metadata.

Then the system is configured to extract the transport and metadata from encoded transport and metadata parameters, for example demultiplex and decode the encoded transport and metadata parameters.

The system (synthesis part) is configured to synthesize an output multi-channel audio signal based on extracted transport audio signals and metadata.

Figure 3:
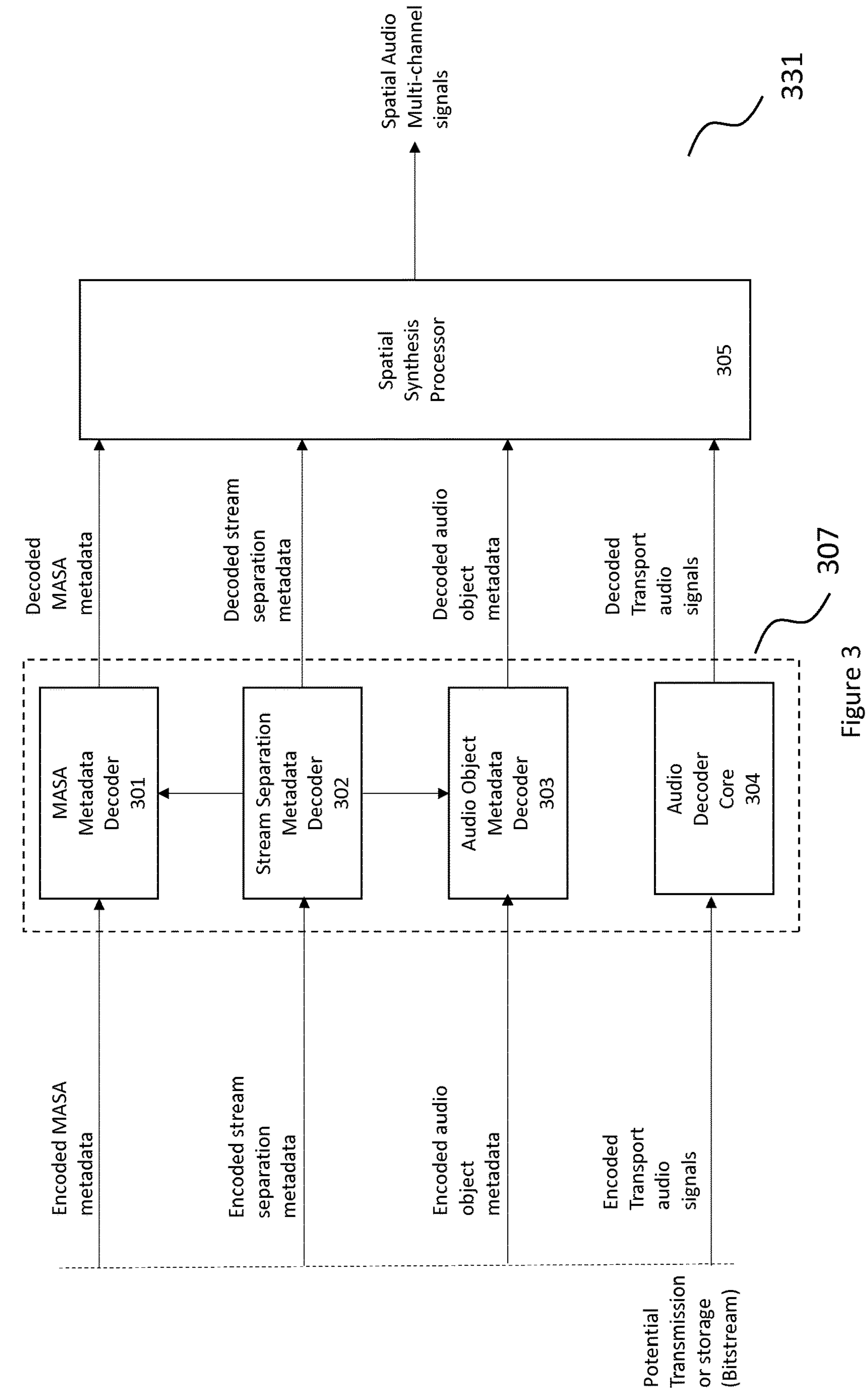
FIG. 3 shows schematically a system of apparatus suitable for implementing some embodiments.

In this regard FIG. 3 depicts an example apparatus and system for implementing embodiments of the application. The system is shown having a 'synthesis' part 331 depicting the decoding of the encoded metadata and downmix signal to the presentation of the re-generated spatial audio signal (for example in multi-channel loudspeaker form).

With respect to FIG. 3 the received or retrieved data (stream) may be received by a demultiplexer. The demultiplexer may demultiplex the encoded streams (encoded MASA metadata, encoded stream separation metadata, encoded audio object metadata and encoded transport audio signals) and pass the encoded streams to the decoder 307.

The audio encoded stream may be passed to an audio decoding core 304 which is configured to decode the encoded transport audio signals to obtain the decoded transport audio signals.

Similarly, the demultiplexer may be arranged to pass the encoded stream separation metadata to the stream separation metadata decoder 302. The stream separation metadata decoder 302 may then be arranged to decode the encoded stream separation metadata by Deindexing the DCT coefficient of order zero.

Golomb Rice decoding the remaining DCT coefficients on the condition that the number of decoded bits is within the allowed number of bits.

The remaining coefficients are set to zero.

Applying an inverse two-dimensional DCT transform in order to obtain the decoded quantised MASA-to-total energy ratios $\mu_q$ (k, n) for the TF tiles of the audio frame.

As depicted in FIG. 3, the MASA-to-total energy ratios $\mu_q$ (k, n) of the audio frame may be passed to the MASA metadata decoder 301 and the audio object metadata decoder 303 to facilitate the decoding of their respective spatial audio (metadata) parameters.

The MASA metadata decoder 301 may be arranged to receive the encoded MASA metadata and with the aid of the MASA-to-total energy ratios $\mu_q(k, n)$ to provide the decoded MASA spatial audio parameters. In embodiments this may take the following form for each audio frame.

Initially, the MASA direct-to-total energy ratios $r_{MASA}(k, n)$ are deindexed using the inverse step to that used by the encoder. This result of this step is the direct-to-total energy ratios $r_{MASA}(k, n)$ for each TF tile.

The direct-to-total energy ratios $r_{MASA}(k, n)$ for each TF tile may then be weighted with the corresponding MASA-to-total energy ratio $\mu_q(k, n)$ in order to provide the weighted direct-to-total energy ratio $wr_{MASA}(k, n)$. This is repeated for all TF tiles in the audio frame.

The weighted direct-to-total energy ratio $wr_{MASA}(k, n)$ may then be scalar quantized using the same optimized scalar quantizer as used at the encoder, for example the 3-bit optimized scalar quantizer.

As in the case of the encoder, the index from the scalar quantizer may be used to determine the allocated number of bits used to encode the remaining MASA spatial audio parameters. For instance, in the example cited for the encoder a 3-bit optimized scalar quantizer was used to determine the bit allocation for the quantization of the MASA spatial audio parameters. Once the bit allocation has been determined the remaining quantized MASA spatial audio parameters can be determined. This may be done according to at least one of the methods described in the following patent application publication WO2020/089510, WO2020/070377, WO2020/008105, WO2020/193865 and WO2021/048468.

The above steps in the MASA metadata decoder 301 are performed for all TF tiles in the audio frame.

The audio object metadata decoder 301 may be arranged to receive the encoded audio object metadata and with the aide of the quantised MASA-to-total energy ratios $\mu_q(k, n)$ to provide the decoded audio object spatial audio parameters. In embodiments this may take the following form for each audio frame.

In some embodiments the audio object-to-total energy ratios $r_{obj}(k, n, i)$ for each audio object i and for the TF tiles (k,n) of the audio frame may be deindexed with the aide of the correct resolution quantizer from a plurality of quantizers which can be used to decode the received audio object-to-total energy ratios $r_{obj}(k, n, i)$. As previously described the audio object-to-total energy ratios $r_{obj}(k, n, i)$ can be quantized using one of a plurality of quantizers of varying resolutions. The particular quantizer to quantize the used audio object-to-total energy ratio $r_{obj}(k, n, i)$ is determined by the value of the quantised MASA-to-total energy ratios $\mu_q(k, n)$ for the TF tile. Consequently, at the audio object metadata decoder 301 the quantised MASA-to-total energy ratios $\mu_q(k, n)$ for the TF tile is used to select the corresponding de-quantizer for the audio object-to-total energy ratios $r_{obj}(k, n, i)$. In other words, there may be a mapping between ranges of MASA-to-total energy ratios $\mu_q(k, n)$ values and the different de-quantizers.

Alternatively, the quantised MASA-to-total energy ratios $\mu_q(k, n)$ for each TF tile of the audio frame may be converted to give the overall factor representing the MASA-to-total energy ratio for the whole audio frame $\mu_F$. According to specific implementation made at the encoder, the derivation of $\mu_F$ may take the form of selecting the minimum quantised MASA-to-total energy ratios $\mu_q(k, n)$ amongst the TF tiles of the frame, or determining a mean value over the MASA-to-total energy ratios $\mu_q(k, n)$ of the audio frame. The value of $\mu_F$ may be used to select the particular de-quantizer (from a plurality of de-quantizers) in order to dequantize the audio object direction parameters for the audio frame.

The output from the audio object metadata decoder 301 may then be the decoded quantised audio object direction parameters for the audio frame and the decoded quantised audio object-to-total energy ratios $r_{obj}(k, n, i)$ for the TF tiles of the audio frame for each audio object. These parameters are depicted in FIG. 3 as the decoded audio object metadata.

The decoder 307 can in some embodiments be a computer or mobile device (running suitable software stored on memory and on at least one processor), or alternatively a specific device utilizing, for example, FPGAs or ASICs.

The decoded metadata and transport audio signals may be passed to a spatial synthesis processor 305.

The spatial synthesis processor 305 configured to receive the transport and metadata and re-creates in any suitable format a synthesized spatial audio in the form of multichannel signals (these may be multichannel loudspeaker format or in some embodiments any suitable output format such as binaural or Ambisonics signals, depending on the use case or indeed a MASA format) based on the transport signals and the metadata. An example of a suitable spatial synthesis processor 305 may be found in the patent application publication WO2019/086757

In other embodiments the spatial synthesis processor 305 may take a different approach for creating the multi-channel output signals. In these embodiments the rendering may be performed in the metadata domain by combining the MASA metadata and audio object metadata in the metadata domain. The combined metadata spatial parameters maybe termed the render metadata spatial parameters and maybe collated on a spatial audio direction basis. For instance, if we have a multi-channel input signal to the encoder which has one identified spatial audio direction, then the rendered MASA spatial audio parameters may be set as $$\theta_{render}(k, n, i) = \theta_{MASA}(k, n)$$

$$\phi_{render}(k, n, i) = \phi_{MASA}(k, n)$$

$$\xi_{render}(k, n, i) = \xi_{MASA}(k, n)$$

$$r_{render}(k, n, i) = r_{MASA}(k, n)\mu(k,n),$$

where i signifies the direction number. For example, in the case of the one spatial audio direction in relation to the input multi-channel input signal, i may take a value of 1 to indicate the one MASA spatial audio direction. Also, the "rendered" direct-to-total energy ratio $r_{render}(k, n, i)$ may be modified by the MASA-to-total energy ratio on a TF tile basis.

The audio object spatial audio parameters may be added into the combined metadata spatial parameters as $$\theta_{render}(k, n, i_{obj}+1) = \theta_{obj}(n, i_{obj})$$

$$\phi_{render}(k, n, i_{obj}+1) = \phi_{obj}(n, i_{obj})$$

$$\xi_{render}(k, n, i_{obj}+1) = 0$$

$$r_{render}(k, n, i_{obj}+1) = r_{obj}(k, n)(1-\mu(k, n))$$

where $i_{obj}$ is the audio object number. In this example, the audio objects are determined to have no spread coherence $\xi$. Finally, the diffuse-to-total energy ratio ($\psi$) is modified using the MASA-to-total energy ratio ($\mu$), and the surround coherence ($\gamma$) is directly set $$\psi_{render}(k, n) = \psi_{MASA}(k, n)\mu(k, n)$$

$$\gamma_{render}(k, n) = \gamma_{MASA}(k, n)$$

Figure 4:
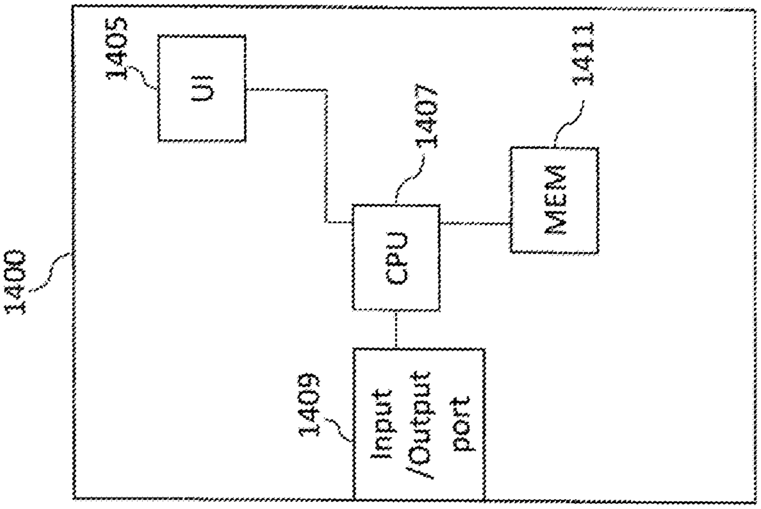
FIG. 4 shows schematically an example device suitable for implementing the apparatus shown.

With respect to FIG. 4 an example electronic device which may be used as the analysis or synthesis device is shown. The device may be any suitable electronics device or apparatus. For example, in some embodiments the device 1400 is a mobile device, user equipment, tablet computer, computer, audio playback apparatus, etc.

In some embodiments the device 1400 comprises at least one processor or central processing unit 1407. The processor 1407 can be configured to execute various program codes such as the methods such as described herein.

In some embodiments the device 1400 comprises a memory 1411. In some embodiments the at least one processor 1407 is coupled to the memory 1411. The memory 1411 can be any suitable storage means. In some embodiments the memory 1411 comprises a program code section for storing program codes implementable upon the processor 1407. Furthermore, in some embodiments the memory 1411 can further comprise a stored data section for storing data, for example data that has been processed or to be processed in accordance with the embodiments as described herein. The implemented program code stored within the program code section and the data stored within the stored data section can be retrieved by the processor 1407 whenever needed via the memory-processor coupling.

In some embodiments the device 1400 comprises a user interface 1405. The user interface 1405 can be coupled in some embodiments to the processor 1407. In some embodiments the processor 1407 can control the operation of the user interface 1405 and receive inputs from the user interface 1405. In some embodiments the user interface 1405 can enable a user to input commands to the device 1400, for example via a keypad. In some embodiments the user interface 1405 can enable the user to obtain information from the device 1400. For example, the user interface 1405 may comprise a display configured to display information from the device 1400 to the user. The user interface 1405 can in some embodiments comprise a touch screen or touch interface capable of both enabling information to be entered to the device 1400 and further displaying information to the user of the device 1400. In some embodiments the user interface 1405 may be the user interface for communicating with the position determiner as described herein.

In some embodiments the device 1400 comprises an input/output port 1409. The input/output port 1409 in some embodiments comprises a transceiver. The transceiver in such embodiments can be coupled to the processor 1407 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The transceiver input/output port 1409 may be configured to receive the signals and in some embodiments determine the parameters as described herein by using the processor 1407 executing suitable code. Furthermore, the device may generate a suitable downmix signal and parameter output to be transmitted to the synthesis device.

In some embodiments the device 1400 may be employed as at least part of the synthesis device. As such the input/output port 1409 may be configured to receive the downmix signals and in some embodiments the parameters determined at the capture device or processing device as described herein and generate a suitable audio signal format output by using the processor 1407 executing suitable code. The input/output port 1409 may be coupled to any suitable audio output for example to a multi-channel speaker system and/or headphones or similar.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs can route conductors and locate components on a semiconductor chip using well established rules of design as well as libraries of pre-stored design modules. Once the design for a semiconductor circuit has been completed, the resultant design, in a standardized electronic format may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising at least one processor and at least one memory including computer program code, the at least one memory and the computer program code configured to, with the at least one processor, cause the apparatus at least to:

determine an audio scene separation metric between an input audio signal comprising two or more audio channel signals and a further input audio signal comprising a plurality of audio object signals; and use the audio scene separation metric for quantizing of at least one spatial audio parameter of the input audio signal, wherein the apparatus caused to determine an audio scene separation metric between an input audio signal comprising two or more audio channel signals and a further input audio signal comprising a plurality of audio object signals is caused to transform the input audio signal into a plurality of time frequency tiles; transform the further input audio signal into a plurality of further time frequency tiles; determine an energy value of at least one time frequency tile; determine an energy value of at least one further time frequency tile; and determine the audio scene separation metric as a ratio of the energy value of the at least one time frequency tile to a sum of the energy value of the at least one time frequency tile and the energy value of the at least one further time frequency tile.

2. The apparatus as claimed in claim 1, further caused to:

use the audio scene separation metric for quantizing at least one spatial audio parameter of the further input audio signal.

3. The apparatus as claimed in claim 2, wherein the apparatus caused to use the audio scene separation metric for quantizing the at least one spatial audio parameter of the further input audio signal is caused to:

select a quantizer from a plurality of quantizers for quantizing the at least one spatial audio parameter of the further input audio signal, wherein the selected quantizer is dependent on the audio scene separation metric; and quantize the at least one spatial audio parameter of the further input audio signal with the selected quantizer.

4. The apparatus as claimed in claim 3, wherein the at least one spatial audio parameter of the further input audio signal is an audio object energy ratio parameter for a time frequency tile of a first audio object signal of the further input audio signal.

5. The apparatus as claimed in claim 4, wherein the audio object energy ratio parameter for the time frequency tile of the first audio object signal of the further input audio signal is determined by the apparatus being caused to:

determine an energy of the first audio object signal of a plurality of audio object signals for the time frequency tile of the further input audio signal;

determine an energy of each remaining audio object signal of the plurality of audio object signals; and determine the ratio of the energy of the first audio object signal to the sum of the energies of the first audio object signal and remaining audio objects signals.

6. The apparatus as claimed in claim 2, wherein the audio scene separation metric is determined between a time frequency tile of the input audio signal and a time frequency tile of the further input audio signal and wherein the apparatus caused to use the audio scene separation metric to determine the quantization of at least one spatial audio parameter of the further input audio signal is caused to:

determine a further audio scene separation metric between a further time frequency tile of the input audio signal and a further time frequency tile of the further input audio signal;

determine a factor to represent the audio scene separation metric and the further audio scene separation metric;

select a quantizer from a plurality of quantizers dependent on the factor; and quantize a further at least one spatial audio parameter of the further input audio signal using the selected quantizer.

7. The apparatus as claimed in claim 6, wherein the further at least one spatial audio parameter is an audio object direction parameter for an audio frame of the further input audio signal.

8. The apparatus as claimed in claim 6, wherein the factor to represent the audio scene separation metric and the further audio scene separation metric is one of:

the mean of the audio scene separation metric and the further audio scene separation metric; or the minimum of the audio scene separation metric and the further audio scene separation metric.

9. The apparatus as claimed in claim 1, wherein the apparatus caused to use the audio scene separation metric for quantizing the at least one spatial audio parameter for the input audio signal is caused to:

multiply the audio scene separation metric with an energy ratio parameter calculated for a time frequency tile of the input audio signal;

quantize the product of the audio scene separation metric with the energy ratio parameter to produce a quantization index; and use the quantization index to select a bit allocation for quantizing the at least one spatial audio parameter of the input audio signal.

10. The apparatus as claimed in claim 9, wherein the at least one spatial audio parameter is a direction parameter for the time frequency tile of the input audio signal, and wherein the energy ratio parameter is a direct-to-total energy ratio.

11. The apparatus as claimed in claim 1, wherein the apparatus caused to use the audio scene separation metric for quantizing the at least one spatial audio parameter of the input audio signal is caused to:

select a quantizer from a plurality of quantizers for quantizing an energy ratio parameter calculated for a time frequency tile of the input audio signal, wherein the selection is dependent on the audio scene separation metric;

quantize the energy ratio parameter using the selected quantizer to produce a quantization index; and use the quantization index to select a bit allocation for quantizing the energy ratio parameter together with the at least one spatial audio parameter of the input signal.

12. The apparatus as claimed in claim 1, wherein the audio scene separation metric provides a measure of relative contribution of each of the input audio signal and the further input audio signal to an audio scene comprising the input audio signal and the further input audio signal.

* * * * *